(12) United States Patent
Witwer et al.

(10) Patent No.: US 8,294,580 B2
(45) Date of Patent: Oct. 23, 2012

(54) SYSTEM AND METHOD OF MONITORING PERSONAL PROTECTIVE EQUIPMENT

(75) Inventors: Robert Witwer, Phoenix, AZ (US); Michel Landry, Mascouche (CA)

(73) Assignee: Honeywell International Inc., Morristown, NJ (US)

( * ) Notice: Subject to any disclaimer, the term of this patent is extended or adjusted under 35 U.S.C. 154(b) by 663 days.

(21) Appl. No.: 12/498,866

(22) Filed: Jul. 7, 2009

(65) Prior Publication Data
US 2011/0006894 A1 Jan. 13, 2011

(51) Int. Cl.
G08B 13/14 (2006.01)
(52) U.S. Cl. ............. 340/572.1; 340/539.11; 340/539.1; 340/568.1
(58) Field of Classification Search ............... 340/539.1, 340/539.11, 568.1, 572.1, 568.7
See application file for complete search history.

(56) References Cited

U.S. PATENT DOCUMENTS

| 5,571,944 | A | 11/1996 | Pfeifer et al. | |
|---|---|---|---|---|
| 7,034,684 | B2* | 4/2006 | Boman et al. | 340/568.1 |
| 7,271,715 | B2* | 9/2007 | Aupperle et al. | 340/539.13 |
| 7,394,364 | B2* | 7/2008 | Elliott | 340/539.23 |
| 7,605,705 | B2* | 10/2009 | Kritt et al. | 340/572.4 |
| 7,817,038 | B2* | 10/2010 | Torning | 340/572.1 |
| 7,898,414 | B2* | 3/2011 | Spano | 340/571 |
| 2005/0068168 | A1* | 3/2005 | Aupperle et al. | 340/539.13 |
| 2005/0148339 | A1* | 7/2005 | Boman et al. | 455/456.1 |
| 2006/0273894 | A1* | 12/2006 | Goehler | 340/539.13 |
| 2008/0266093 | A1* | 10/2008 | Schuler et al. | 340/572.1 |
| 2010/0058857 | A1 | 3/2010 | Zhang | |
| 2010/0141087 | A1 | 6/2010 | Bostan et al. | |
| 2010/0259389 | A1* | 10/2010 | Marshall | 340/572.1 |

FOREIGN PATENT DOCUMENTS
WO WO 2006/096431 A2 9/2006

OTHER PUBLICATIONS
European Search Report corresponding to Application No. EP 10 16 7796, dated Dec. 28, 2010.

* cited by examiner

Primary Examiner — Travis Hunnings
(74) Attorney, Agent, or Firm — Husch Blackwell LLP

(57) ABSTRACT

A multi-level equipment configuration monitoring system can include a plurality of RFID tags associated with respective user protective elements such as respirators, eye protectors, gloves boots, helmets and hearing protectors. A user communication unit can activate the tags and determine which elements are present. The determined elements can be compared to a pre-stored, approved list of elements to establish the state of a user's complement of protective equipment. Missing equipment can be immediately identified and brought to the user's attention. Information can be collected as to duration of use of the elements as well as duration of exposure of those elements to one or more predetermined hazardous conditions to schedule maintenance and replacement.

19 Claims, 1 Drawing Sheet

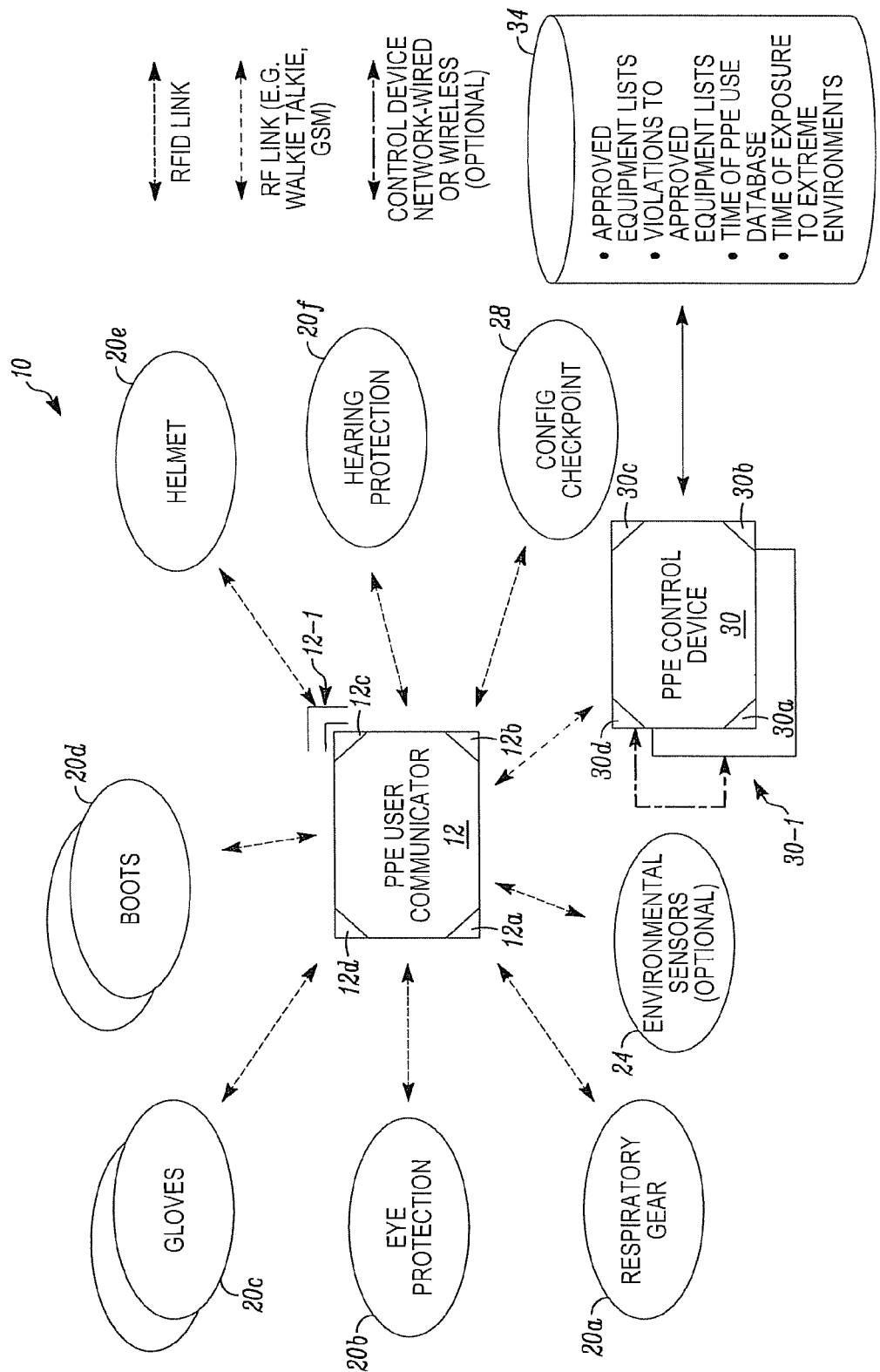

SYSTEM AND METHOD OF MONITORING PERSONAL PROTECTIVE EQUIPMENT

FIELD

The invention pertains to systems and methods of monitoring and keeping track of a first responder's personal protective equipment. More particularly, the invention pertains to such systems and methods which use various wireless technologies to initially monitor that a first responder is equipped with predetermined personal, protective equipment and to subsequently check the status of that equipment.

BACKGROUND

First responders, such as firefighters or hazardous materials handlers usually wear or carry a predetermined complement of personal protective equipment which can include gloves, eye and/or hearing protective devices, helmets, respiratory gear, boots and the like all without limitation. Not only must the complement of equipment be complete to be sure that maximum protection is provided, but at times the gear has predetermined lifetimes which must be respected for the safety of that individual.

In addition to the above, it would be desirable to be able to monitor and log the environmental conditions to which the individual has been subjected to facilitate maintenance and timely replacement of such equipment.

BRIEF DESCRIPTION OF THE DRAWINGS

FIG. 1 is a block diagram of an embodiment of the invention.

DETAILED DESCRIPTION

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

In one aspect of the invention, monitoring can be implemented to ensure that personnel that need to wear a defined complement of personal protective equipment (PPE) can be sure they actually wearing, or carrying that complement of equipment. In another aspect of the invention, usage time for specific elements, or, pieces of PPE can be measured and tracked, and maintenance or replacement can be planned in accordance therewith. In a further aspect of the invention, the environmental conditions to which the PPE have been exposed can be logged and tracked to assist with planned maintenance/or replacement In one system which embodies the invention, radio frequency identification (RFID) would be incorporated into all PPE components. These RFID tags would uniquely identify the part number and serial number of each piece of personal protective equipment. In another embodiment of the invention, a PPE user communication unit could be carried by each user. This unit could be, for example, wrist-worn.

In one form, the unit could include an RFID reader and an RF link to enable it to communicate with a displaced PPE Control Device. This device could, for example, collect PPE configuration and usage data from each PPE user communication unit. If so equipped, it could also collect environmental data to correlate with the time of use data for each PPE component. All such information could be stored in a computer readable storage memory, such as a semiconductor storage unit or a magnetic or optical mass storage unit such as a disk drive.

The system could be provided with a defined set of customer applications that would run on the PPE Control Device; examples might include an ability to list each PPE component, time used, time exposed to specific environmental conditions. User violations, for example, equipment removed that should not have been, could be logged and subsequently listed or printed out. Automatic indications can be provided of a need for required maintenance/replacement of PPE components, based on exceeding pre-defined limits of usage or environmental exposure. Such applications could be offered in the context of a pay-per-month-type service.

In yet another embodiment, communications radios or cellular-type devices can be integrated with the user communication unit, or, device. Global positioning circuitry can be included to be able track user location.

FIG. 1 illustrates a system 10 which embodies the present invention. System 10 includes at least one user communication unit 12 which could be worn or carried by a respective user such as a firefighter or a hazardous material control person. Those of skill will understand that system 10 would usually include a plurality 12-1 of such units, one of which would be associated with each such individual. Members of the plurality 12-1 are substantially identical and as a result, a discussion of unit 12 will also apply to other members of the plurality.

Unit 12 can be implemented with control circuits which could include one or more programmable processors, such as 12a and associated control software 12b. Software 12b can be stored for access and execution by processor 12a on a local computer readable storage medium such as a semiconductor memory device or a magnetic or optical mass storage device such as a disk drive.

The unit 12 can also include a display device and associated display software indicated generally at 12c. The display device can be carried by the unit 12 or on a separate unit, for example a first responder's visor as a heads up display. The unit 12 could be carried or worn, such as on a wrist, of the associated user or first responder.

The unit 12 can also carry one or more receivers or transceivers, indicated generally at 12d, such as one or more RFID signal receivers, RF transceivers of various types which could include cellular-type interfaces all without limitation. The RFID signal receivers can receive information from RFID sensors, or tags, which are associated with various elements 20 of protective gear of a type wearable or usable by the individual carrying the unit 12. These could include without limitation, respiratory gear 20a, eye protection devices 20b, gloves 20c, boots 20d, helmet 20e, and hearing protection devices 20f. Those of skill will understand that the enumeration of members of the plurality 20 is exemplary only and not a limitation of the invention. Other elements can be added to the plurality 20 without departing from the spirit and scope of the invention.

A plurality of environmental sensors 24 can also incorporate RFID-type tags and communication with the unit 12. Such sensors could include smoke, flame or gas sensors all without limitation. Such sensors could be of a type which could be worn or carried by the individual associated with the unit 12.

A configuration checkpoint 28 which can include an RFID tag can be used in conjunction with the unit 12 to initiate an automatic configuration check of the user PPE configuration. Unit 12, upon sensing the RFID tag in the configuration checkpoint 28, could initiate a check of the user PPE in the same manner as described subsequently in paragraph without requiring the user to manually press a "check" button. The configuration checkpoint could be placed at a location where it is expected that the user will have all the required PPE on their person, for example at a dressing room exit.

System 10 can also include one or more PPE control devices indicated generally at 30-1. Device 30 is representative of the members of the plurality 30-1 and as a result a discussion of device 30 will apply to other members of the plurality 30-1.

Device 30 can include at least one programmable processor 30*a* and associated executable control software 30*b*. All such software can be stored on a semiconductor, magnetic or optical computer readable storage device without limitation. Unit 30 also includes a computer readable storage unit 34, semiconductor, optical or magnetic which provides storage for lists of approved equipment, previously detected violations of approved equipment lists, one or more databases such as a time of use data base for the members of the plurality 20 as well as a time of exposure data base, relative to extreme environments or hazardous conditions of the members of the plurality 20.

Device 30 can also include a display device and graphical user interface software, indicated generally at 30*c*, to present situation information visually and graphically. One or more RF transceivers 30*d*, some of which could be cellular-type interfaces can also be carried by device 30 to provide communication with or among members of the plurality 12-1 and 30-1.

Devices such as device 30 could be carried on vehicles, or located at command posts to provide situation commanders current information as to status of the gear being carried by or worn by respective first responders addressing the current problem or condition. In addition to being able to communication with local data bases 34, the device 30 can also communicate directly with other members of the plurality 30-1 as well as members of the plurality 12-1.

In using embodiments of the invention, once the individual has finished putting on all PPE equipment, for example from the plurality 12, the PPE UC 12 could perform a PPE configuration check. This configuration check would compare the equipment on that individual with a pre-stored authorized PPE list. This check could be initiated manually or automatically.

The PPE configuration manual check could take place once the individual believes they have the correct complement of PPE and they are displaced several feet from other individuals, at which time they could press a "check" button on the user communicator 12. At this time the PPE UC, unit 12, would interrogate the equipment and perform the configuration check.

The user equipment configuration could be automatically checked either: after the individual has passed a defined physical checkpoint that has an RFID tag, for example, a dressing room exit; or within a specified time period after an "out of config" notification—this time period could be defined in the authorized personal protective equipment list.

If the user communicator 12 detects an unauthorized PPE configuration on an individual, it could notify the individual via either an aural alert and/or display on the device 12. The Authorized PPE list could also contain the conditions for sending "in config" or "out of config" message to the PPE Control Device. Alert/alarms would vary based on the severity of the unauthorized configuration.

The unit 12 could include a timer that would record how long each element of the personal protective equipment was in use. This usage time could be sent to the PPE control device, for example device 30, at the end of usage for data logging.

The control device 30 could enable the device user, for example a situation commander, to view the configuration state of selected individuals via communication with specific devices from the plurality 12-1. In yet another aspect of the invention, the control device 30 could enable the device user to run reports to assess how much "time of use" each specific protective element, such as 20*a* for example, had incurred.

In other embodiments, the PPE control device 30 could be pre-programmed to generate maintenance alerts if "time of use" exceeded a pre-established value. It could also enable the device user to run reports to review equipment use history (by PPE type and specific PPE unit), review PPE usage by specific individuals or groups, and keep a history of "out of config" alerts.

Environmental sensors (e.g. temp, altitude), such as sensors 24, could be included with RFID interfaces to enable the gathering and transmittal of environmental data. Such data could be useful in establishing the time interval(s) that specific protective elements, from plurality 20, were exposed to particular environmental conditions.

Environmental data could be sent from the members of the plurality 12-1 to the control device(s) 330-1 for data logging. Maintenance alerts could be generated in a manner analogous to the "time of use" alerts described above. These maintenance alerts would indicate that specific protective elements only have a defined amount of useable life left, or had exceeded their useable life.

Further, the authorized PPE list could also require sensing of multiple individuals to complete the authorized configuration; e.g. when two or more workers are required in a confined space for safety reasons. This could be accomplished by including an RFID tag in each of the members of the plurality 12-1. In this embodiment, the authorized PPE list would then consist of an individual's own PPE and the RFID of the co-worker(s).

In another aspect of the invention, the user communicator(s) 12-1 could include a capability, for example, a. pushbutton, for the individual to indicate that he/she was going "out of configuration"; e.g. to remove equipment for a work break. The time of day and duration of the "out of configuration" situation could be recorded by the respective unit from the plurality 12-1 and transmitted to one or more control device from the plurality 30-1 for data logging.

In yet another aspect, the configuration checkpoint could contain a User Communicator that was fixed in position. This could be used as a lower cost alternative to each user carrying a User Communicator.

In accordance with the above embodiment, if a group of first responders always put on and take off PPE in defined locations, a Communicator could be installed at configuration checkpoint, i.e. the entry/exit of this location. Each individual could be configuration checked as they leave the area. Out of configuration alerts would still be generated by the fixed Communicator, and the time of PPE use could be measured by the configuration checkpoint Communicator sensing when users return and measuring the elapsed time since they left the area. The Communicator could still work as described above, including the option for manual operation (users pushes button) and automatic operation (fixed Communicator senses equipment passing by). The Communicator could still communicate with the Control Unit as described above.

Advantageously, the above described embodiment does not limit users to a single dressing room. Users could dress in one area, then undress in another (e.g. a cleaning area for after PPE use). In this embodiment, all that would be needed would be a Communicator at the entry/exit of each area.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A system comprising:
a plurality of personal protective elements where each member of the plurality carries a radio-frequency identifier-type tag;
a user communication unit in wireless communication with the members of the plurality where the user communication unit includes at least one computer readable storage unit for storing therein a plurality of indicia indicative of expected members of the plurality and includes a timer for recording how long each member of the plurality of personal protective elements is in use.

2. A system as in claim 1 where the communication unit includes circuitry to compare sensed members of the plurality to stored members of the plurality of indicia and circuits, responsive thereto, for emitting at least one of audible or visual indicia indicative of differences therebetween.

3. A system as in claim 1 where the communication unit is one of user wearable, or, user carriable.

4. A system as in claim 1 where the elements are selected from a class which includes at least respiration equipment, eye protectors, gloves, boots, helmets, hearing protectors and fire resistant clothing.

5. A system as in claim 1 which includes a configuration check point with at least an RFID tag that uniquely identifies that configuration check point.

6. A system as in claim 5 where reading of the RFID tag at the configuration checkpoint by the communication unit causes the communication unit to automatically initiate a configuration check.

7. A system as in claim 6 where communication unit includes circuitry, to carry out the configuration check by comparing sensed members of the plurality to stored members of the plurality of indicia and circuits, responsive thereto, for emitting at least one of audible or visual indicia indicative of differences there between.

8. A system as in claim 4 where the unit includes a display device to provide configuration information to a user.

9. A system as in claim 1 further comprising at least one environmental sensor that carries a radio-frequency identifier-type tag, the at least one environmental sensor monitoring a selected hazardous condition, wherein the user communication unit is in wireless communication with the at least one environmental sensor, and wherein the user communication unit includes circuits to process data from the timer and from the at least one environmental sensor to log duration of exposure of the plurality of personal protective elements to the selected hazardous condition.

10. A monitoring apparatus comprising:
at least one supervisory monitoring device which includes a programmable processor and at least one computer readable storage unit which includes control software executable by the processor along with at least one of, selected, pre-stored combinations of personal protective equipment, duration of use of each member of a plurality of personal protective equipment and duration of exposure to predetermined environments;
a wireless transceiver coupled to the monitoring device; and
a multi-dimensional display device and associated graphical user software implemented, at least in part, by the processor where the interface presents visual information as to protective equipment configurations of selected individuals,
wherein the monitoring device, via the transceiver, communicates with members of a plurality of user communication units, each of which is associated with a different user, and provides at least one approved user equipment combination to at least some members of the plurality, and
wherein at least one of the communication units includes a timer for recording how long each piece of personal protective equipment is in use.

11. An apparatus as in claim 10 where at least one of the communication units compares the at least one approved user equipment combination to a sensed combination of user equipment, and responsive thereto emits one of an audible or a visual feedback indictor.

12. An apparatus as in claim 10 which includes a plurality of user communication units in wireless communication with the monitoring device.

13. An apparatus as in claim 12 where the user communication units receive at least one approved protective equipment list from a respective monitoring device and where the communication units include circuits to determine the equipment configuration associated with a respective user.

14. An apparatus as in claim 13 where the communication units include circuitry to compare the equipment configuration associated with the respective user with the received approved protective equipment list, and responsive thereto, to emit an audible or visual indicator thereof to the user.

15. An apparatus as in claim 14 where at least some of the communication units transmit results of the comparison to the monitoring device.

16. An apparatus as in claim 14 where at least some of the communication units include circuits to process data from the timer and from at least one associated environmental sensor to log time durations of exposure of respective personal protective equipment to a hazardous condition monitored by the at least one associated environmental sensor and to forward such duration information to the monitoring device.

17. An apparatus as in claim 16 where the monitoring device stores received duration information from the communications units in the storage unit.

18. A multi-level equipment configuration monitoring system comprising:
a plurality of RFID tags associated with respective user protective gear selected from a class which includes at least respiration equipment, eye protection equipment, gloves, boots, helmets and hearing protection equipment;
at least one user carriable communication unit which can activate at least some of the tags and determine which of the members of the class are responding, where the unit includes a pre-stored approved combination of class members, circuitry, responsive to the responding class members and the stored class members for determining if the responding class members are the same as the members of the stored combination of class members, and a timer for recording how long each member of the class is in use; and
a display device, coupled to the communication unit wherein the unit can activate the display device to emit indicia indicative of differences between the responding class members and the pre-stored class members.

19. A system as in claim 18 which includes a control device, in wireless communication with the communication unit, the device includes a computer readable storage device to store information pertaining to duration of use of the class members and duration of exposure of class members to predetermined conditions.

\* \* \* \* \*